US006405216B1

United States Patent
Minnaert et al.

(10) Patent No.: US 6,405,216 B1
(45) Date of Patent: Jun. 11, 2002

(54) INTERNET-BASED APPLICATION PROGRAM INTERFACE (API) DOCUMENTATION INTERFACE

(75) Inventors: Gary Minnaert; Ayanna Sawyer, both of San Jose, CA (US); Alexander Thayer, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/398,379

(22) Filed: Sep. 17, 1999

(51) Int. Cl.$^7$ ............................................. G06F 17/30
(52) U.S. Cl. ........................ 707/104.1; 707/4; 707/10; 707/102; 707/513; 707/514
(58) Field of Search .............................. 707/104.1, 102, 707/4, 10, 513, 514, 103 R; 709/224

(56) References Cited

U.S. PATENT DOCUMENTS

| | | | | |
|---|---|---|---|---|
| 5,701,451 A | | 12/1997 | Rogers et al. | 707/1 |
| 5,701,471 A | | 12/1997 | Subramanyam | 707/6 |
| 5,721,908 A | | 2/1998 | Lagarde et al. | 707/10 |
| 5,752,246 A | | 5/1998 | Rogers et al. | 707/10 |
| 5,754,772 A | | 5/1998 | Leaf | 709/203 |
| 5,892,905 A | | 4/1999 | Brandt et al. | 713/201 |
| 6,041,331 A | * | 3/2000 | Weiner et al. | 707/103 |
| 6,055,544 A | * | 4/2000 | DeRose et al. | 707/104 |
| 6,081,840 A | * | 6/2000 | Zhao | 709/224 |
| 6,167,409 A | * | 12/2000 | DeRose et al. | 707/513 |

FOREIGN PATENT DOCUMENTS

| | | |
|---|---|---|
| JP | 10116220 | 5/1998 |
| WO | WO 97/19415 | 5/1997 |
| WO | WO 98/44434 | 10/1998 |

OTHER PUBLICATIONS

Patents Act 1977: Search Report under Section 17(5).
"Collecting Bucket Index Statistical Data with Colocation Considered", IBM Technical Disclosure Bulletin vol. 36, No. 5, May 1993, pp. 1–2.
"Graphical Interface for Displaying the Transactions Per Second Rate of Individual Parallel Database Nodes", IBM Technical Disclosure Bulletin, vol. 36, No. 1, Jan. 1993.
"Extended Hyper Text Markup Language Syntax to Support Complex Data Structures", *IBM Technical Disclosure Bulletin*, vol. 41, No. 01, pp. 533–534, Jan. 1998.
"Internet Access to Databases with User–Defined Fields", *IBM Technical Disclosure Bulletin*, vol. 40, No. 10, pp. 133–134, Oct. 1997.
"Service to Enable Common Gateway Interface Programs within Tivoli Management Environment Netfinity Based Internet Applications", *IBM Technical Disclosure Bulletin*, vol. 40, No. 07, pp. 1–4, Jul. 1997.
"Javadoc—The Java API Documentation Generator", pp. 1–39, Sep. 4, 1999. http://java.sun.com/products/jdk/1.3/docs/tooldocs/solaris/javadoc.html.
"1.3 Overview of Bookmaster", IBM Document Composition Facility (DCF), Copyright IBM Corp. 1987, 1995.

* cited by examiner

Primary Examiner—Diane D. Mizrahi
(74) Attorney, Agent, or Firm—Gates & Cooper LLP (57) ABSTRACT

A method, apparatus, and article of manufacture for customizing a document interface for display on a computer monitor. In accordance with the present invention, a documentation file is retrieved. Next, an input from a user is received. The input from the user comprises an instruction for customizing a hierarchical format of the retrieved documentation file. Based on the received input from the user, the hierarchical format of the retrieved documentation file is dynamically customized.

27 Claims, 8 Drawing Sheets

INTERNET-BASED APPLICATION PROGRAM INTERFACE (API) DOCUMENTATION INTERFACE

BACKGROUND OF THE INVENTION

1. Field of the Invention

This invention relates in general to a documentation interface, and, in particular, to an Internet-based application program interface (API) documentation interface.

2. Description of Related Art

An application program interface (API) is a set of routines, protocols, and tools for building software applications. Most operating environments provide an API so that programmers can write applications that are consistent with an operating environment. The APIs typically have documentation that provides instructions for using the API.

The documentation can exist in a variety of forms. In the past, the most common form for the documentation was bounded, hard-copy manuals. These manuals were typically large and bulky manuals that contained hundreds of pages of detailed information. To locate and retrieve information from these manuals, programmers were typically forced to search through massive amounts of irrelevant information.

In this age of information technology, an abundance of these hard-copy manuals have been converted to electronic versions (also referred to as on-line versions) and placed on the Internet. Further, some of the new documentation is specially designed for the Internet. The Internet is a type of global computer network that offers a vast amount of information to a multitude of diverse computer users. Via its networks, the Internet enables many users from different geographical locations to access information stored in data sources (e.g., databases) that are located around the world. The World Wide Web (WWW or the web) is the fastest growing part of the Internet. The WWW is a system of Internet servers that support specifically formatted documents (e.g., HTML documents). These documents include, but are not limited to, on-line versions of the API documentation.

Many on-line versions of API documentation use file formats, such as portable document format (PDF) files or Post Script files. These file formats capture formatting information from a variety of desktop publishing applications, making it possible to produce images on a monitor. The images contain the API documentation. Like the hard-copy manuals, the images are virtually inaccessible by many users because the images are difficult to search.

Some electronic versions of the API documentation are written in Standard Generalized Markup Language (SGML). SGML is a system for organizing and tagging text in a document. SGML was developed and standardized by the International Organization for Standards (ISO), and it is used to manage large documents that are subject to frequent revisions and need to be printed or displayed in different formats. However, programmers and other computer users typically experience difficulty searching through SGML versions of API documents. Like the PDF files and post script files, most SGML versions of the API documents are difficult to use because users have to search through massive amounts of information before locating their desired topic. It is noted that, SGML cannot be viewed on the web unless it is converted to a language that is used to create documents on the web.

Documents for the web may be created using Hyper Text Markup Language (HTML). HTML is one way of defining and interpreting tags according to SGML rules. In an effort to make the API documentation accessible to web users, conventional systems convert SGML versions of API documentation to HTML versions of API documentation. The HTML versions, however, are virtually inaccessible to many web users. Like the SGML versions of the API documentation, the HTML versions are often extremely difficult to search.

To eliminate the burden of searching through massive amounts of irrelevant information, the Javadoc Tool, developed by Sun Microsystems, Palo Alto, Calif. provides an API documentation interface. This interface provides a mechanism for searching API documentation. The Javadoc Tool, however, can only be used in conjunction with Java source code. In fact, the Javadoc Tool uses the Java compiler to extract comments from Java source code. The Javadoc Tool then uses these comments to create an API documentation interface. The Javadoc Tool provides limited benefits because it can not be used with other languages. For example, the Javadoc Tool can not be used with Active X, C++ or any other high level language.

Thus, there is a need in the art for an improved API documentation interface that enables easily locating desired data, and that works with any language.

SUMMARY OF THE INVENTION

To overcome the limitations in the prior art described above, and to overcome other limitations that will become apparent upon reading and understanding the present specification, the present invention discloses a method, apparatus, and article of manufacture for customizing a document interface for display on a computer monitor.

In accordance with the present invention, a documentation file is retrieved. Next, an input from a user is received. The input from the user comprises an instruction for customizing a hierarchical format of the retrieved documentation file. Based on the received input from the user, the hierarchical format of the retrieved documentation file is dynamically customized.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
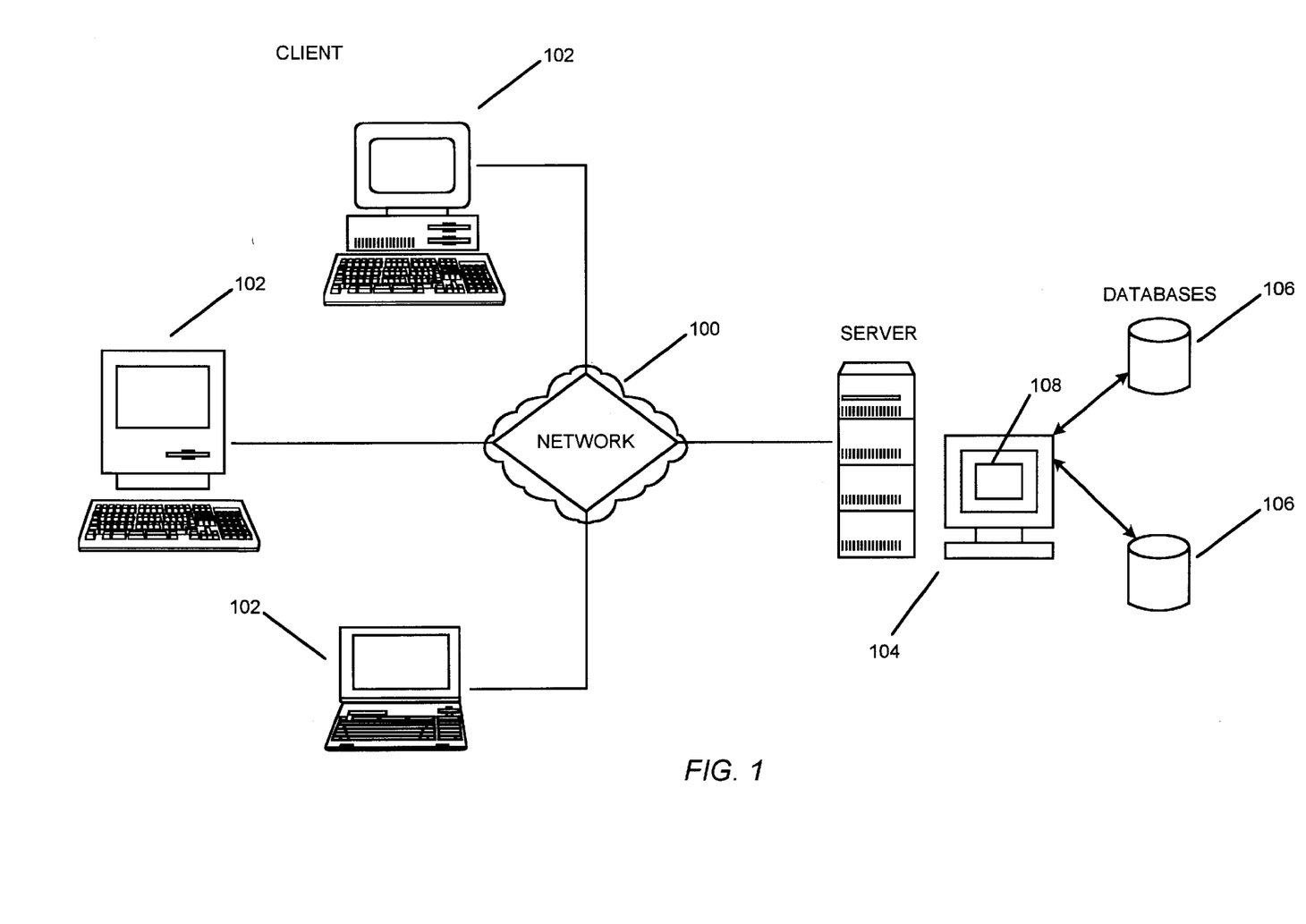
FIG. 1 schematically illustrates a hardware environment of a preferred embodiment of the present invention, and more particularly, illustrates a typical distributed computer system.

FIG. 1 schematically illustrates the hardware environment of a preferred embodiment of the present invention, and more particularly, illustrates a typical distributed computer system using the network 100 to connect client computers 102 executing client applications to a server computer 104 executing software and other computer programs, and to connect the server system 104 to data sources 106. A data source 106 may comprise, for example, a multi-media database. A typical combination of resources may include client computers 102 that are personal computers or workstations, and a server computer 104 that is a personal computer, workstation, minicomputer, or mainframe. These systems are coupled to one another by various networks, including LANs, WANs, SNA networks, and the Internet.

A client computer 102 typically executes a client application and is coupled to a server computer 104 executing server software. The client computer 102 is bi-directionally coupled with the server computer 104 over a line or via a wireless system. In turn, the server computer 104 is bi-directionally coupled with data sources 106.

Figure 2:
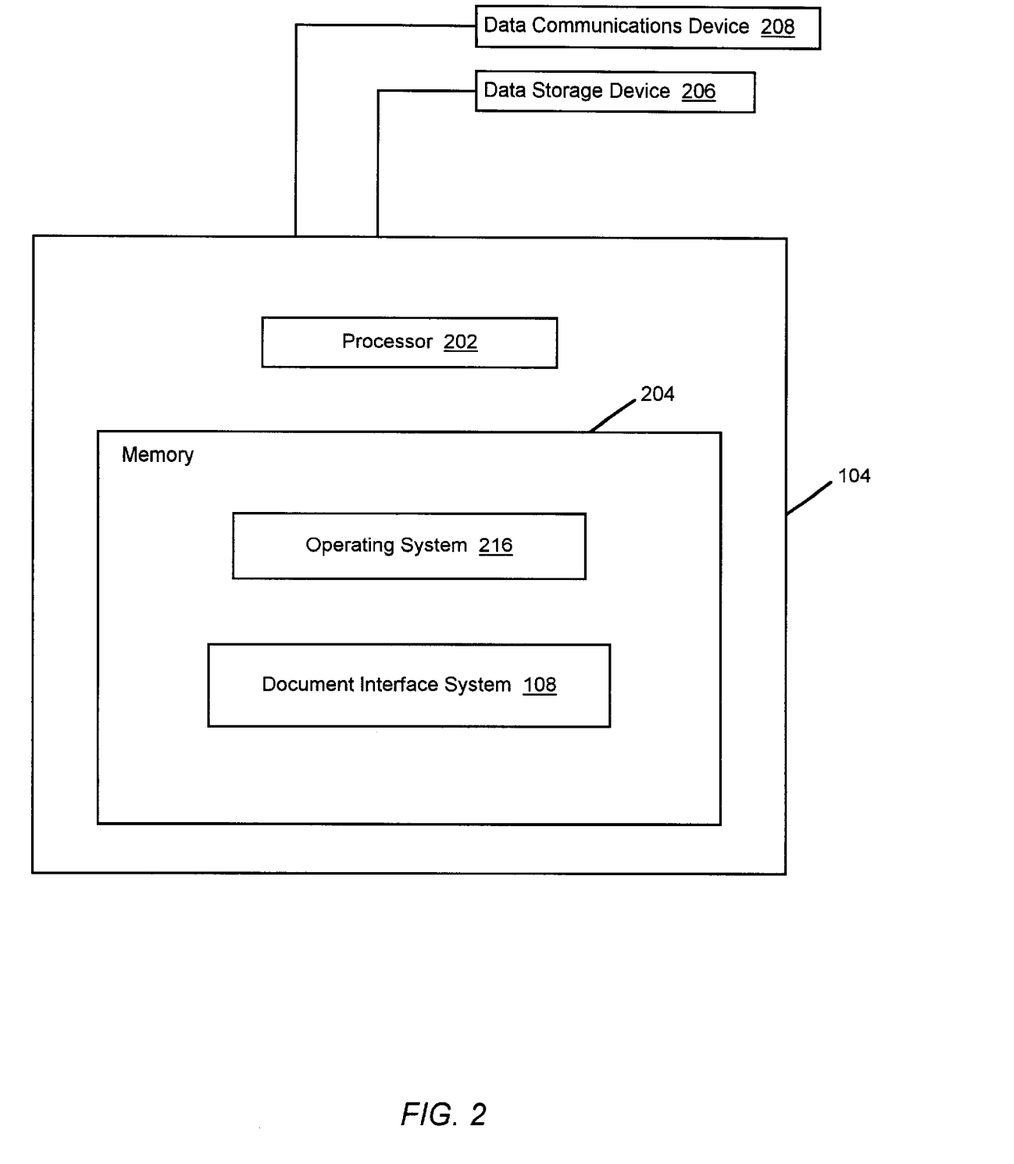
FIG. 2 schematically illustrates a server computer.

FIG. 2 shows and exemplary server computer 104. The server computer 104 generally comprises a processor 202, random access memory (RAM) 204, data storage devices 206 (e.g., hard drive, floppy, and/or CD-ROM disc drives, etc.), data communication devices 208 (e.g., modems, network interfaces, etc.). It is envisioned that, attached to the server computer 104 may be other devices such as a local area network (LAN) or wide area network (WAN), a video card, and a bus interface. The server computer 104 operates under the control of an operating system 216 stored in the memory. Those skilled in the art will recognize that any combination of the above components, or any number of different components, peripherals, and other devices, may be used with the server computer 104.

The present invention is preferably implemented in one or more computer programs or applications (hereinafter referred to as the document interface system 108). The document interface system 108 creates an improved document interface for display on the client computer 102. The operating system 216 controls the execution of the document interface system 108. Under the control of the operating system 216, the document interface system 108 may be loaded from the data storage device 206, and/or remote devices into the memory 204 of the server computer 104 for use during actual operations. Generally, the operating system 216 and the document interface system 108 are tangibly embodied in and/or readable from a device, carrier, or media, and/or remote devices coupled to the server computer 104 via the data communication device 208.

In one embodiment of the present invention, to access the server computer 104 and the document interface system 108, the client computer 102 must have a common browser that interfaces with the server computer 104. Common browsers include Netscape Navigator™ or Microsoft Internet Explorer™. Those skilled in the art will recognize that other alternative browsers may be used without departing from the scope of the present invention. The server computer 104 uses the server software to sense the browser type and adjust itself accordingly.

Those skilled in the art will recognize that the exemplary hardware environments illustrated in FIGS. 1 and 2 are not intended to limit the present invention. Indeed, those skilled in the art will recognize that other alternative hardware environments may be used without departing from the scope of the present invention.

Document Interface System

The disclosed embodiment of the present invention provides a document interface system 108 for customizing an API documentation interface. The documentation interface is a graphical user interface (GUI) that allows users to access and search on-line API documentation. The GUI has multiple windows and frames that allow users to quickly navigate through hundreds of pages of documentation. The GUI is created from a documentation file, such as an Internet file. As used herein, an Internet file is a HTML file or a XML file.

Before the GUI is generated, conversion tools such as, ID workbench, manufactured by International Business Machines, Corp., Armonk, N.Y., are used to convert a documentation file (e.g, an SGML file) into an Internet file (e.g., HTML, XML, etc.). The documentation file can be generated from any language including, but not limited to, Active X, C++, and Java.

In a preferred embodiment of the invention, the documentation file is a file that contains a hierarchical representation of information, such as a detailed table of contents. This table of contents may have a high level section, such as chapters; a high level sub-section, such as chapter sub-sections; and text for each section. It is noted that the text can include API documentation, as well other types information. In fact, it is conceivable that the text could be a fictional novel, a college text book, or any substantive text that may be partitioned into sections.

In an embodiment of the present invention, once the documentation file is converted into an Internet file, the Internet file is stored in a user-defined directory, which only contains Internet files that are used by the document interface system 108. Of course, those skilled in the art should recognize that other methods of storing the Internet file can be used without exceeding the scope of the present invention. The document interface system 108 retrieves the file from the user-defined directory and modifies the Internet file to customize the GUI.

The document interface system 108 has multiple windows and frames. As discussed herein, a window is an enclosed area on a display screen. A user can set the dimensions of a window and the position of the window within the display screen. Frames are used in conjunction with HTML. A frame refers to dividing a browser display area into separate sections, each of which is a different web page that can be searched by a user.

Figure 3:
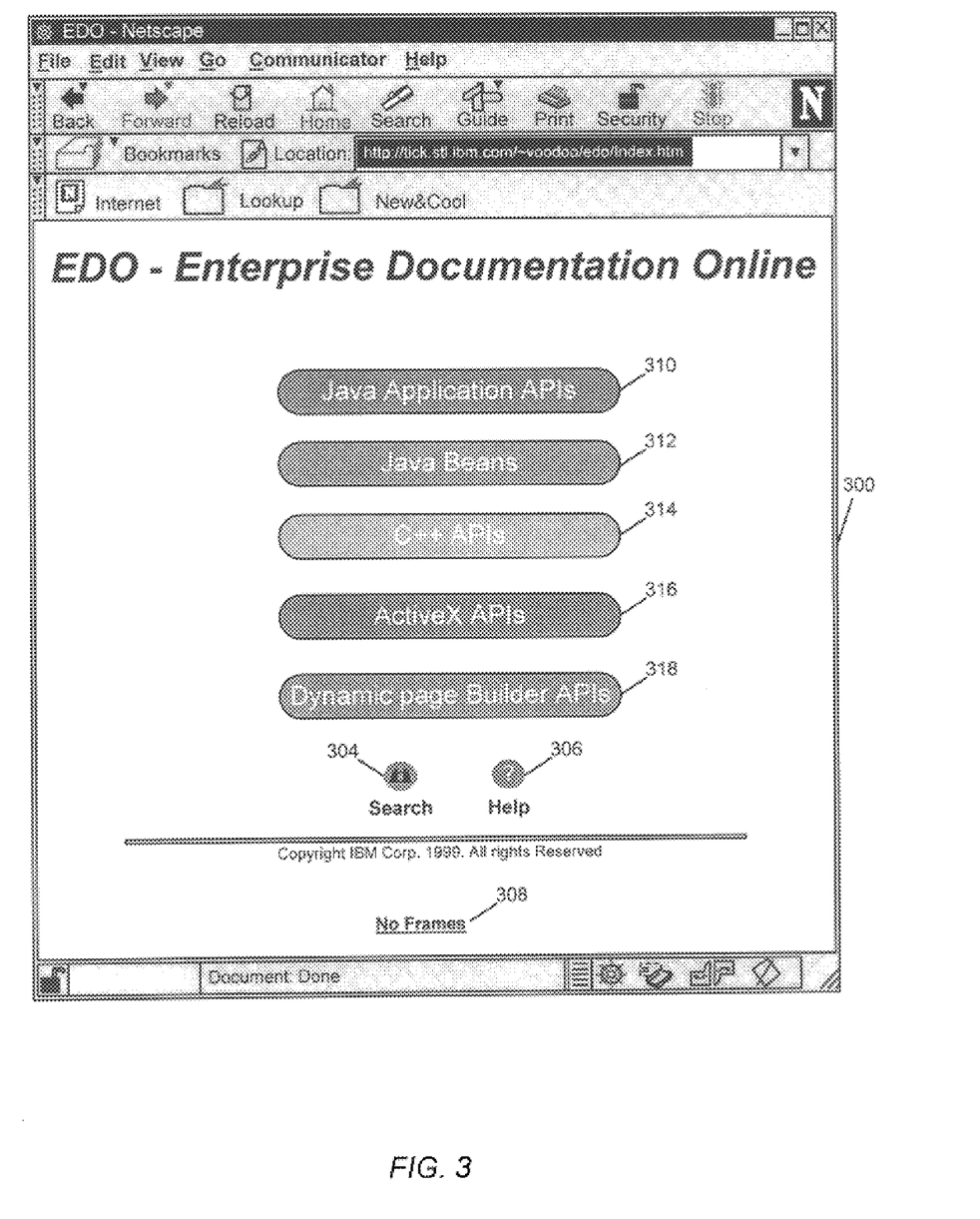
FIG. 3 illustrates a first window displayed on a computer monitor in accordance with an embodiment of the present invention.

The first window of the GUT provides a menu in which the user can select a specific programming language, such as Java, C++ or Active/X. FIG. 3 shows the first window 300. The first window has a search command button 304, a help command button 306, and a No Frames button 308. The first window also has language command buttons 310, 312, 314, 316, and 318 that each represent a programing language. When the user clicks a particular language command button 310, 312, 314, 316, or 318, the document interface system 108 customizes the GUI by displaying language specific information.

Figure 4A:
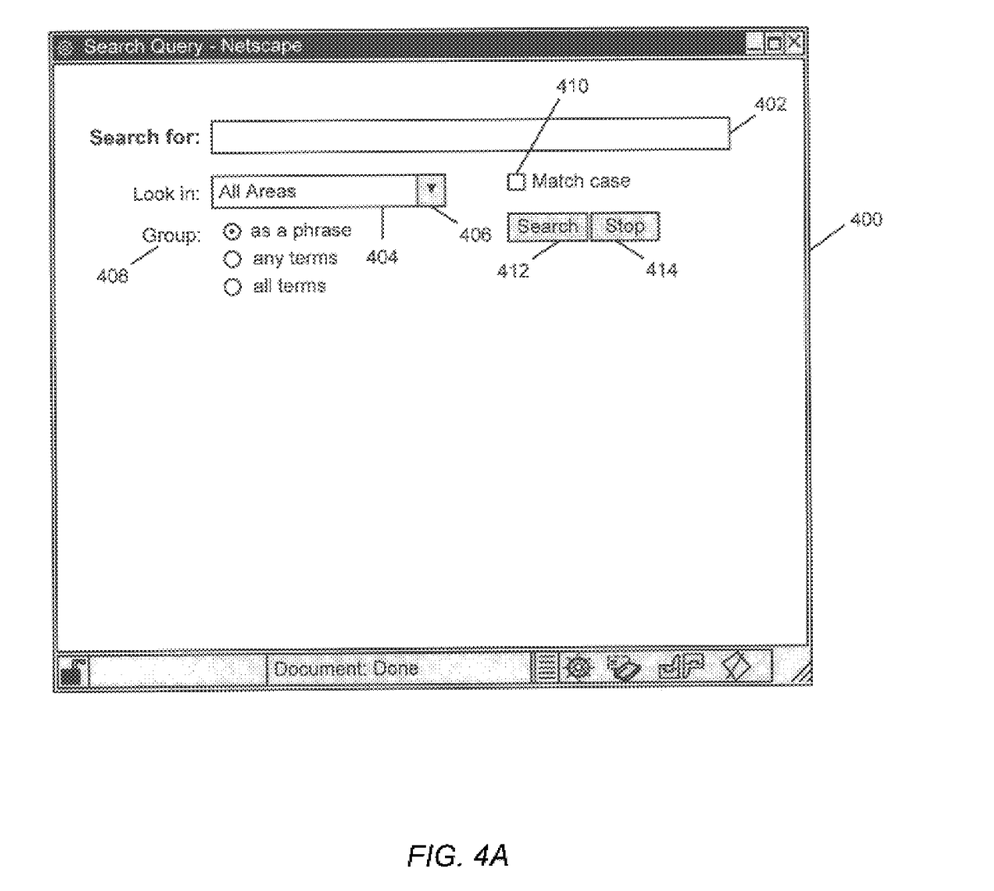
FIGS. 4A–4B illustrate a Search Query dialog box displayed on a computer monitor in accordance with an embodiment of the present invention.

When a user clicks on the search command button 304, the document interface system 108 generates a dialog box. FIG. 4A shows the Search Query dialog box 400. The Search Query dialog box 400 is used to perform searches on the API documentation. The user enters keywords, and the document interface system 108 retrieves API documentation that contains the entered keywords. The Search Query dialog box 400 contains a Search for request box 402 for entering keywords. The Search Query dialog box 400 also contains a Look in request box 404. The Look in request box 404 provides a drop down menu when the Look in arrow 406 is clicked by the user. The drop down menu provides a list of available locations for searching.

Figure 6:
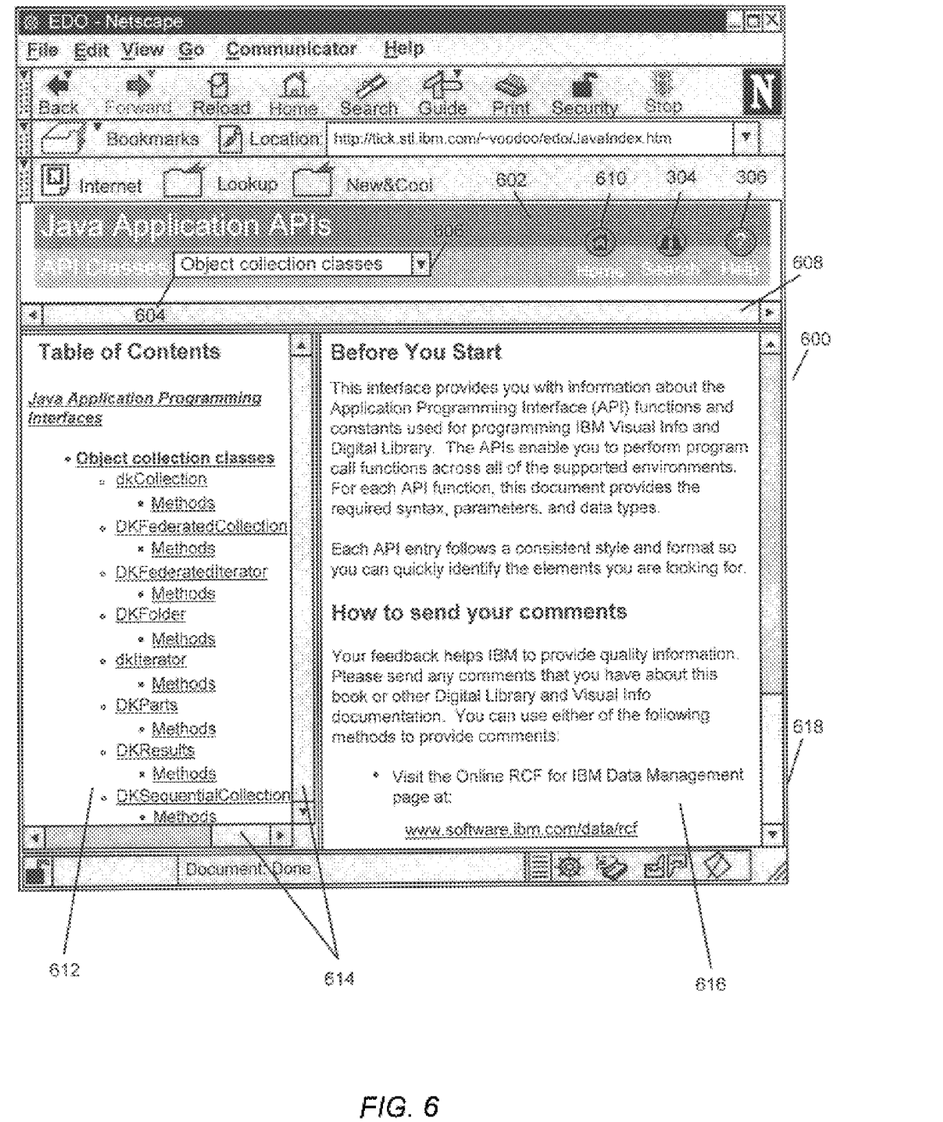
FIG. 6 illustrates a three framed window displayed on a computer monitor in accordance with an embodiment of the present invention.

The user may select a searching location from the list of available locations. The available locations include: "All Areas," "Top Frame," "Left Frame," and "Right Frame." The "All Areas" location includes the "Top Frame," "Left Frame," and "Right Frame." The frames are illustrated in FIG. 6, and a description of the frames is provided during the discussion of FIG. 6 below.

The Search Query dialog box 400 also has a Group option 408 that allows a user to define the scope of a search. For instance, a user may define the scope of the search by clicking on the following options: "as a phrase" or "any terms" or "all terms." Additionally, the search window has a Match case option 410. A user can determine whether the document interface system 108 should check the case of the keyword when searching the API documentation. Finally, the Search Query dialog box 400 contains a search command button 410 and a stop command button 412. The search command button 410 instructs the document interface system 108 to perform a search, and the stop command button 412 instructs the document interface system to stop searching. Indeed, other search dialog boxes may be used without exceeding the scope of the present invention, such as a dialog box that requests a natural language search term.

Figure 4B:
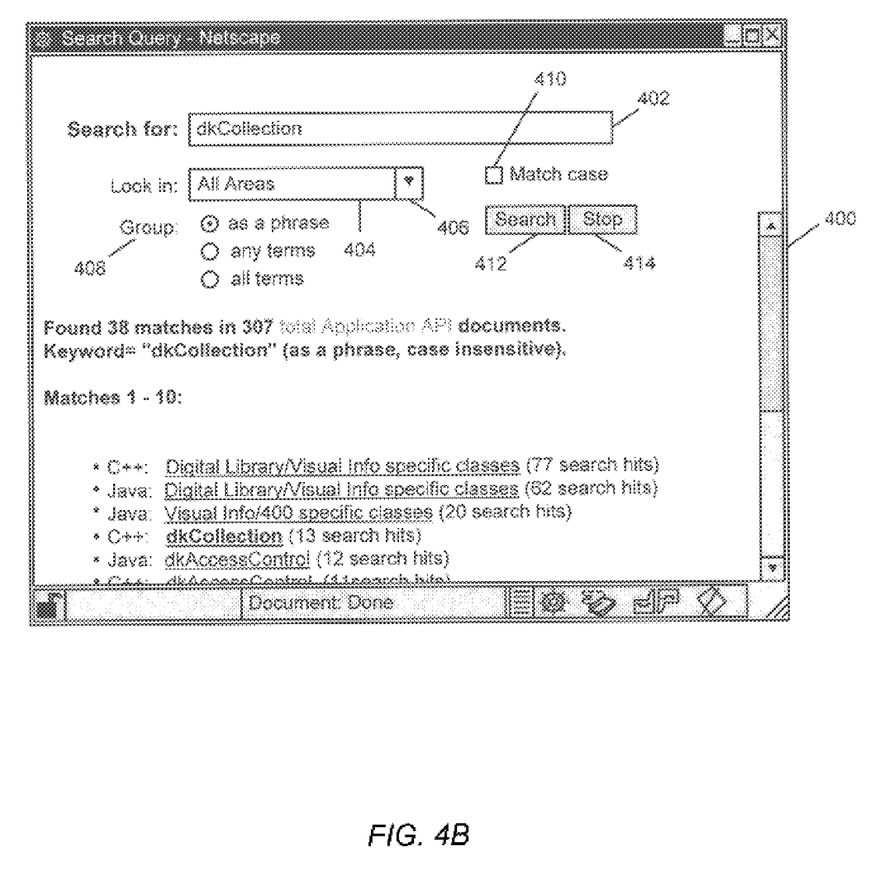

FIG. 4B shows the results of an exemplary search. The Search for box 402 contains the phrase "dkCollection." In response to this search request, the document interface system 108 found 38 matches in 307 total Application API documents, as shown in FIG. 4B. As shown in FIG. 4B, the search results are not limited to a particular language. For example, the document interface system 108 found the phrase "dkCollection" in C++ documents and Java documents.

Figure 5:
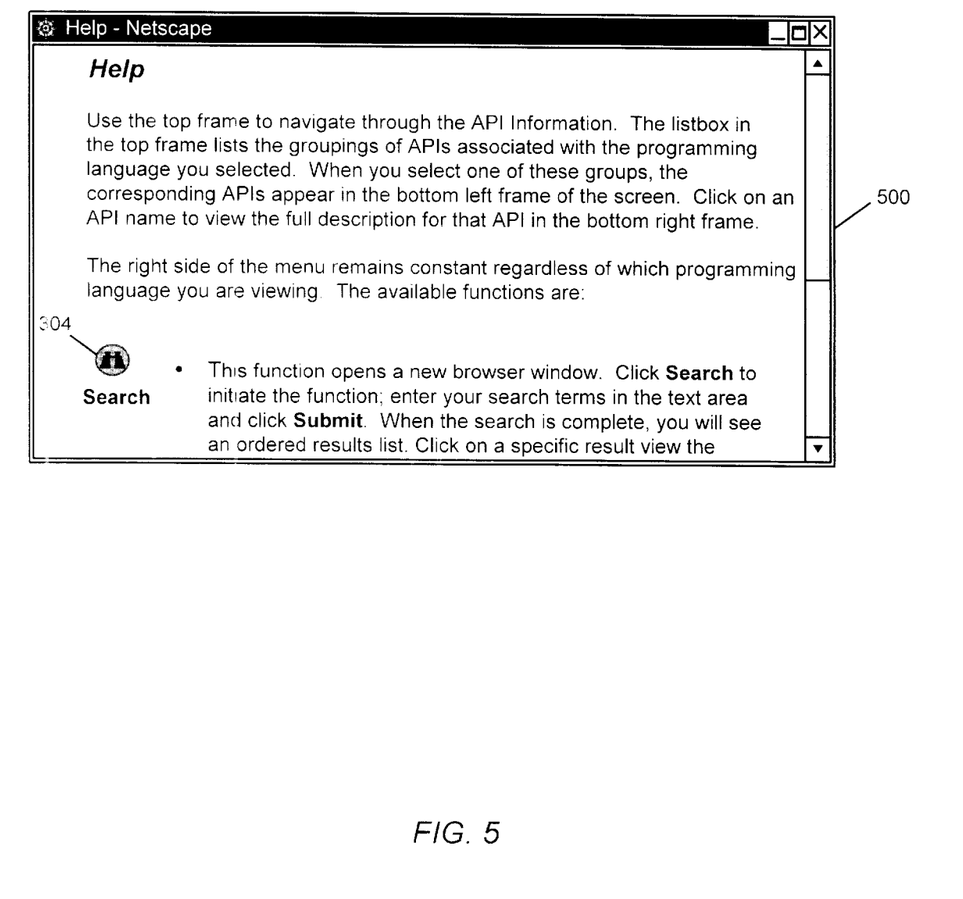
FIG. 5 illustrates a Help dialog box displayed on a computer monitor in accordance with an embodiment of the present invention.

Returning to FIG. 3, when a user clicks the help button 306, a Help dialog box appears. FIG. 5 shows the help dialog box 500. The help dialog box 500 displays information about using the document interface system 108. The help dialog box 500 also contains the search button 304.

Returning to FIG. 3, the No frames button 308 allows a user to determine whether to view the API documentation in a framed window. If the user clicks on the No frames button 308, the documentation is displayed within a window that lacks frames (i.e., all text within one window, not separated into frames). Otherwise, the documentation is displayed within a window that contains frames, as shown in FIG. 6.

FIG. 6 shows a three framed window 600. When the user clicks a particular language command button 310,312, 314, 316, or 318 (see FIG. 3), the document interface system creates this three framed window 600. This three framed window 600 displays the documentation using a hierarchical format, such that high level sections (e.g., chapter sections) are displayed in the top frame 602 and the high level sub-sections (e.g., chapter sub-sections) are displayed in the left frame 612. The top frame 602 provides language specific information. For example, when a user clicks the language button 310, 312, 314, 316, or 318 (see FIG. 3), the top frame 602 displays information about a particular language. To illustrate, suppose a user clicks the Java Application APIs button 310 (see FIG. 3), the top frame 602 displays information about Java Application APIs, as shown in FIG. 6. Similarly, when the user clicks the Active X APIs button 312 (see FIG. 3), the top frame 602 displays information about Active X APIs. Hence, the content or substance of the top frame 602 is customized by the user. That is, the user dynamically customizes the top frame 602 by clicking on a language command button 310, 312, 314, 316, or 318.

The top frame 602 contains a top frame drop down menu 604 that contains the high level sections of an API documentation. A user can select a particular high level section by clicking on the drop down arrow 606. In FIG. 6, the selected high level section is "Object collection classes." The top frame 602 also contains the search command button 304, the help command button 306, and a home command button 610. When a user clicks on the home command button, the document interface system 108 returns to the first window 300 (see FIG. 3).

The left frame 612 provides high level sub-sections. In this example, high level sub-sections for the "Object collection classes" include: "dkCollection," "DKFederatedCollection," "DKFolder," and a list of other high level sub-sections. The right frame 616 provides the detailed description of the document.

Those skilled in the art will recognize that the exemplary three framed window 600 illustrated in FIG. 6 is not intended to limit the invention. Indeed, those skilled in the art will recognize that other alternative frame and window arrangements may be used without departing from the scope of the present invention.

Using the document interface system 108, programmers and computer users can easily locate desired data from API documentation that is written in any language. For example, each frame can be searched by clicking on the Search command button 304. Users can also browse through the information contained in each frame by using the scroll bars, 608, 614, and 618. These searching and browsing tools eliminate the burden of searching through massive amounts of irrelevant information. Instead, users are able to quickly and efficiently retrieve information about desired subjects.

Figure 7:
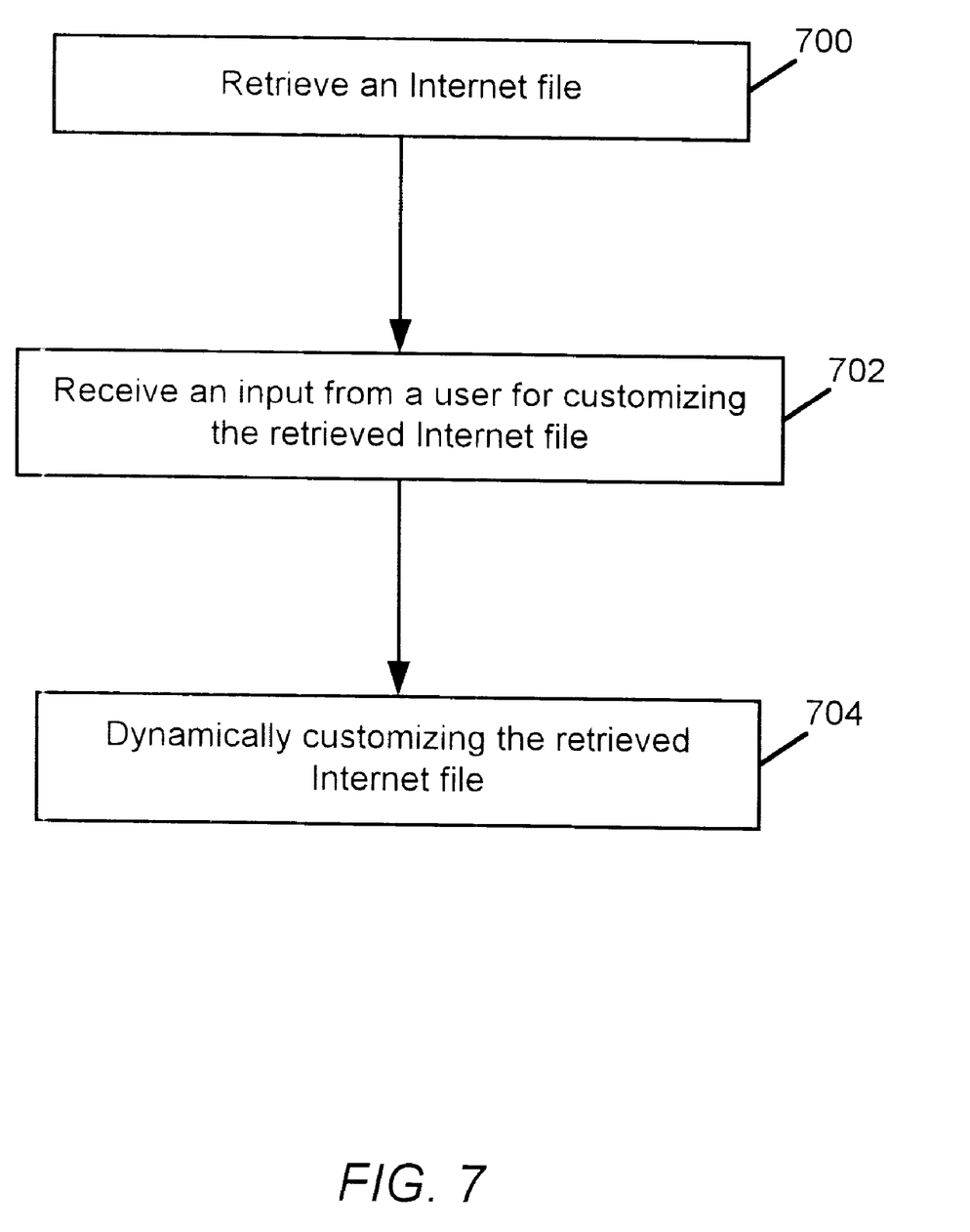
FIG. 7 is a flow chart illustrating the steps performed by the document interface system in accordance with an embodiment of the present invention.

FIG. 7 is a flow chart that illustrates the steps performed in accordance with an embodiment of the present invention. Block 700 represents the document interface system 108 retrieving an Internet file. An input is then received from a user when the user clicks a language command button 310,312,314,316 or 318 (see FIG. 3), as represented by block 702. This input contains instructions for customizing the received Internet file. The instructions include, but are not limited to, the language of the API documentation (e.g., Active X, Java, C++). More specifically, the instructions specify the content of the top frame 602, the left frame 612, and the right frame 616. Based on the received user input, the document interface system 108 dynamically customizes the received Internet file, as represented by block 704.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of customizing a document interface for display on a computer monitor:

retrieving a documentation receiving an input from a user, wherein the input from the user comprises an instruction for customizing a display of a hierarchical format of the retrieved documentation file; and based on the received input from the user, dynamically customizing the display of the hierarchical format of the retrieved documentation file.

2. The method of claim 1, wherein the documentation file is an Internet file, and wherein the Internet file is derived from one of a plurality of languages.

3. The method of claim 1, wherein the step of retrieving further comprises retrieving the documentation file from a user-defined directory.

4. The method of claim 1, wherein the documentation file is comprised of documentation and a detailed table of contents, and wherein the table of contents is divided into two or more high level sections, and each high level section has at least two high level sub-sections.

5. The method of claim 4, wherein the step of dynamically customizing the display of the documentation file further comprises the step of dividing the documentation file into the hierarchical format, such that a first frame contains the high level sections, a second frame contains the high level sub-sections, and a third frame contains the documentation.

6. The method of claim 4, wherein the method further comprises the step of providing a browsing tool, wherein the browsing tool allows the user to view an entire table of contents.

7. The method of claim 1, wherein the method further comprises the step of providing a searching tool, wherein the searching tool recovers a search result that is written in one of a plurality of languages.

8. The method of claim 7, wherein the search tool provides for a selection of a search location within the hierarchical format.

9. The method of claim 1, wherein the step of dynamically customizing comprises displaying multiple frame in a window wherein each frame comprises a hierarchical section of the documentation file.

10. An apparatus for customizing a document interface, comprising:

a computer and a computer monitor for displaying the document interface; and one or more computer programs, performed by the computer, for retrieving a documentation file, receiving an input from a user, wherein the input from the user comprises an instruction for customizing a display of a hierarchical format of the retrieved documentation file, based on received input from the user, dynamically customizing the display of the hierarchical format of the retrieved documentation file.

11. The apparatus of claim 10, wherein the documentation file is an Internet file, and wherein the Internet file is derived from one of a plurality of languages.

12. The apparatus of claim 10, wherein retrieving further comprises retrieving the documentation file from a user-defined directory.

13. The apparatus of claim 10, wherein the documentation file is comprised of documentation and a detailed table of contents, and wherein the table of contents is divided into two or more high level sections, and each high level section has at least two high level subsections.

14. The apparatus of claim 13, wherein dynamically customizing the display of the documentation file further comprises one or more computer programs, performed by the computer for dividing the documentation file into the hierarchical format, such that a first frame contains the high level sections, a second frame contains the high level sub-sections, and a third frame contains the documentation.

15. The apparatus of claim 13, wherein the apparatus further comprises one or more computer programs, performed by the computer, for providing a browsing tool, wherein the browsing tool allows the user to view an entire table of contents.

16. The apparatus of claim 10, wherein the apparatus further comprises one or more computer programs, performed by the computer, for providing a searching tool, wherein the searching tool recovers a search result that is written in one of a plurality of languages.

17. The apparatus of claim 16, wherein the search tool provides for a selection of a search location within the hierarchical format.

18. The apparatus of claim 10, wherein dynamically customizing the documentation file further comprises displaying multiple frames in a window wherein each frame comprises a hierarchical section of the documentation file.

19. An article of manufacture comprising a computer program carrier readable by computer and embodying one or more instructions executable by computer to perform method steps for customizing a document interface for display on a computer monitor:

retrieving a documentation file;

receiving an input form a user, wherein the input from the user comprises an instruction for customizing a display of a hierarchical format of the retrieved documentation file; and based on the received input from the user, dynamically customizing the display of the hierarchical format of the retrieved documentation file.

20. The article of manufacture of claim 19, wherein the documentation file is an Internet file, and wherein the Internet file is derived from one of a plurality of languages.

21. The article of manufacture of claim 19, wherein the step of retrieving further comprises retrieving the documentation file from a user-defined directory.

22. The article of manufacture of claim 19, wherein the documentation file is comprised of documentation and a detailed table of contents, and wherein the table of contents is divided into two or more high level sections, and each high level section has at least two high level sub-sections.

23. The article of manufacture of claim 22, wherein the step of dynamically customizing the display of the documentation file further comprises the step of dividing the documentation file into the hierarchical format, such that a first frame contains the high level sections, a second frame contains the high level sub-sections, and a third frame contains the documentation.

24. The article of manufacture of claim 22, wherein the method further comprises the step of providing a browsing tool, wherein the browsing tool allows the user to view an entire table of contents.

25. The article of manufacture of claim 19, wherein the method further comprises the step of providing a searching tool, wherein the searching tool recovers a search result that is written in one of a plurality of languages.

26. The article of manufacture of claim 25, wherein the search tool provides for a selection of a search location within the hierarchical format.

27. The article of manufacture of claim 19, wherein the step of dynamically customizing the documentation file further comprises the of displaying multiple frame in a window wherein each frame comprises a hierarchical section of the documentation file.

* * * * *

UNITED STATES PATENT AND TRADEMARK OFFICE
CERTIFICATE OF CORRECTION

PATENT NO. : 6,405,216 B1
DATED : June 11, 2002
INVENTOR(S) : Gary Minnaert, Ayanna Sawyer and Alexander Thayer It is certified that error appears in the above-identified patent and that said Letters Patent is hereby corrected as shown below:

Column 7,
Line 10, after "documentation" insert -- ; --
Line 47, "frame" should read -- frames --

Column 8,
Line 35, "form" should read -- from --

Column 10,
Line 1, after "the" insert -- step --
Line 1, "frame" should read -- frames --

Signed and Sealed this

Twenty-fourth Day of June, 2003

JAMES E. ROGAN
*Director of the United States Patent and Trademark Office*